(12) United States Patent
Kirkland (10) Patent No.: US 7,110,995 B2
(45) Date of Patent: Sep. 19, 2006

(54) APPARATUS AND METHOD FOR GENERATING GRAPHIC PRESENTATION OF ESTIMATED TIME OF COMPLETION OF A SERVER REQUEST

(75) Inventor: Dustin Kirkland, Austin, TX (US)

(73) Assignee: International Business Machines Corporation, Armonk, NY (US)

(*) Notice: Subject to any disclaimer, the term of this patent is extended or adjusted under 35 U.S.C. 154(b) by 569 days.

(21) Appl. No.: 10/087,952

(22) Filed: Feb. 27, 2002

(65) Prior Publication Data

US 2003/0163478 A1 Aug. 28, 2003

(51) Int. Cl.
*G06F 7/00* (2006.01)
(52) U.S. Cl. .......................................... 707/3; 707/102
(58) Field of Classification Search ................ 707/102, 707/3
See application file for complete search history.

(56) References Cited

U.S. PATENT DOCUMENTS

| | | | |
|---|---|---|---|
| 5,301,348 A | 4/1994 | Jaaskelainen | 395/800 |
| 5,594,529 A * | 1/1997 | Yamashita et al. | 399/8 |
| 5,657,450 A * | 8/1997 | Rao et al. | 707/10 |
| 5,815,566 A * | 9/1998 | Ramot et al. | 379/210.01 |
| 6,009,483 A | 12/1999 | Fueki | 710/36 |
| 6,038,588 A | 3/2000 | Nagarajayya et al. | 709/102 |
| 6,182,072 B1 | 1/2001 | Leak et al. | 707/10 |
| 6,275,987 B1 * | 8/2001 | Fraley et al. | 717/127 |
| 6,362,836 B1 * | 3/2002 | Shaw et al. | 345/744 |
| 6,542,468 B1 * | 4/2003 | Hatakeyama | 370/238 |
| 2001/0055017 A1 * | 12/2001 | Ording | 345/440 |
| 2002/0124244 A1 * | 9/2002 | Skaringer et al. | 717/171 |
| 2002/0194325 A1 * | 12/2002 | Chmaytelli et al. | 709/224 |

FOREIGN PATENT DOCUMENTS

| | | |
|---|---|---|
| JP | 6161745 A | 5/1994 |
| WO | WO 01/06362 A1 | 1/2001 |

OTHER PUBLICATIONS

Goose, S. et al., "A 3D Audio Only Interactive Web Browser: Using Spatialization to Convey Hypermedia Document Structure", Proceedings ACM Multimedia 99, pp. 363-371, Published New York, NY, USA, 1999, xv+500 pp., abstract.
IBM Technical Disclosure Bulletin, "Method of Sharing an Intelligent Progress Bar Across Remote Machines", vol. 37, No. 03, Mar. 1994, pp. 427-428.

* cited by examiner

*Primary Examiner*—Tim Vo
*Assistant Examiner*—Cheyne Ly
(74) *Attorney, Agent, or Firm*—Duke W. Yee; Jeffrey S. LaBaw; Peter B. Manzo (57) ABSTRACT

An apparatus and method for generating a graphical representation of an estimated time of completion of a content request and the current progress toward completion of the content request, taking into account the processes being performed to prepare the data for transfer to the requesting client device, are provided. With the apparatus and method, a table lookup in a request database is performed based on parameters included in a content request received from a client device. The closest matching entry in the request database is retrieved which includes an associated estimated time of completion of the request. This estimated time of completion of the request is then used along with current system conditions, to generate an estimated time of completion for the current content request. The estimated time of completion for the current content request is then forwarded to the requesting client device which generates a graphical and/or textual representation of the estimated time of completion.

28 Claims, 5 Drawing Sheets

APPARATUS AND METHOD FOR GENERATING GRAPHIC PRESENTATION OF ESTIMATED TIME OF COMPLETION OF A SERVER REQUEST

BACKGROUND OF THE INVENTION

1. Technical Field

The present invention is directed to an apparatus and method for generating a graphical representation of an estimated time of completion of a server request taking into account server processing time.

2. Description of Related Art

The use of graphical progress bars to inform a user of the amount of progress in downloading a data file from a server is generally known in the art. These progress bars often provide a graphical indication of the percentage of a file that has been downloaded and the percentage left to be downloaded. Many times the graphical indication is accompanied by download rate information and an estimated remaining time to download the file.

These progress bars are limited in that the graphical indication of progress is only based on the size of the file being downloaded and the amount of the file already downloaded. The estimated remaining time to download the file is based only on the download rate and the remaining amount of data to be downloaded. These prior art progress bars only refer to the actual data transfer and do not provide any information regarding the actual preparation, on the backend server, of the data being downloaded.

Many times, dynamically created content, such as webpages and files, are bound to operationally intensive processes running on backend servers. The time required to perform these operationally intensive processes significantly impacts the time required to fulfill a content request from a client device. Because known progress bars do not account for this backend processing and preparation of the data to be downloaded, the known progress bars are inaccurate and provide a false indication to the user of the estimated time of completion of the content request.

Thus, it would be beneficial to have an apparatus and method for graphically depicting an accurate estimated time of completion of a content request as well as the progress toward completion of the content request. It would be beneficial for such a graphical depiction to account for operationally intensive processes being performed on the backend server to prepare the data for download to the requesting client device.

SUMMARY OF THE INVENTION

The present invention provides an apparatus and method for generating a graphical representation of an estimated time of completion of a content request and the current progress toward completion of the content request, taking into account the processes being performed to prepare the data for transfer to the requesting client device. In this way, the user of the client device is provided with an accurate depiction of the current progress and estimated time remaining to complete the content request.

The apparatus and method of the present invention, in a preferred embodiment, performs a table lookup in a request database that associates parameters included in the content request received from the client device. The closest matching entry in the request database is then retrieved along with an associated estimated time of completion of the request. This estimated time of completion of the request is then used along with current system conditions, to generate an estimated time of completion for the current content request. The estimated time of completion for the current content request is then forwarded to the requesting client device which generates a graphical and/or textual representation of the estimated time of completion.

Having generated the graphical and/or textual representation, the client device counts down the time using an internal clock and updates the graphical/textual representation. When data is first received from the server for the content request, the graphical/textual representation is then updated to reflect the fact that the data transfer is now being performed. Thereafter, the current progress and estimated time remaining is updated based on the data transfer rate and the amount of data remaining to be downloaded.

These and other features and advantages of the present invention will be described in, or will become apparent to those of ordinary skill in the art in view of, the following detailed description of the preferred embodiments.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

The present invention provides a mechanism for representing the progress of fulfilling a request for content taking into account retrieval and/or preparation time for retrieving and/or preparing the requested content. While the exemplary embodiments of the present invention will be described with regard to a distributed data processing system and, in particular, to a system in which web pages represent the requested content, the present invention is not limited to such. Rather, the present invention may be implemented in a stand alone computing system and/or may be implemented such that data files and the like are the requested content. As will be readily apparent to those of ordinary skill in the art, other modifications to the present invention may be made without departing from the spirit and scope of the present invention.

Figure 1:
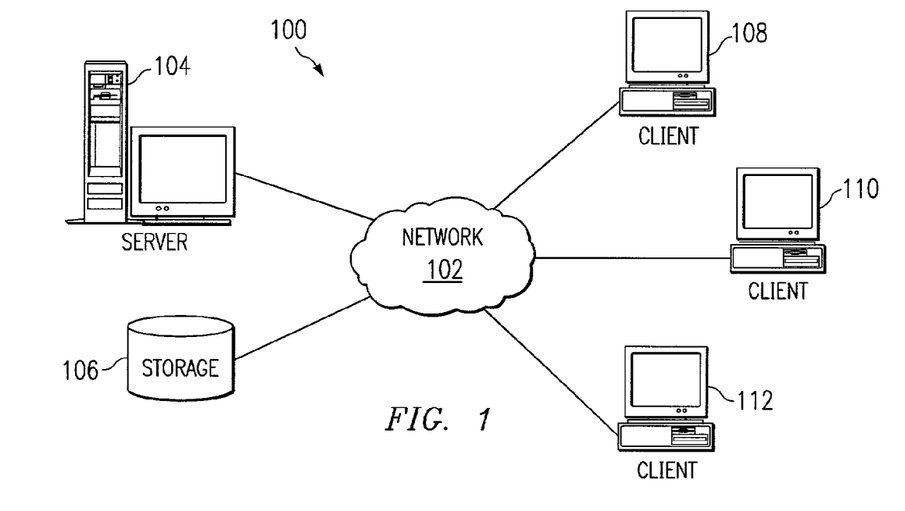
FIG. 1 is an exemplary block diagram of a distributed data processing system environment in which the present invention may be implemented.

With reference now to the figures, FIG. 1 depicts a pictorial representation of a network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, server 104 is connected to network 102 along with storage unit 106. In addition, clients 108, 110, and 112 are connected to network 102. These clients 108, 110, and 112 may be, for example, personal computers or network computers. In the depicted example, server 104 provides data, such as boot files, operating system images, and applications to clients 108–112. Clients 108, 110, and 112 are clients to server 104. Network data processing system 100 may include additional servers, clients, and other devices not shown. In the depicted example, network data processing system 100 is the Internet with network 102 representing a worldwide collection of networks and gateways that use the TCP/IP suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

Figure 2:
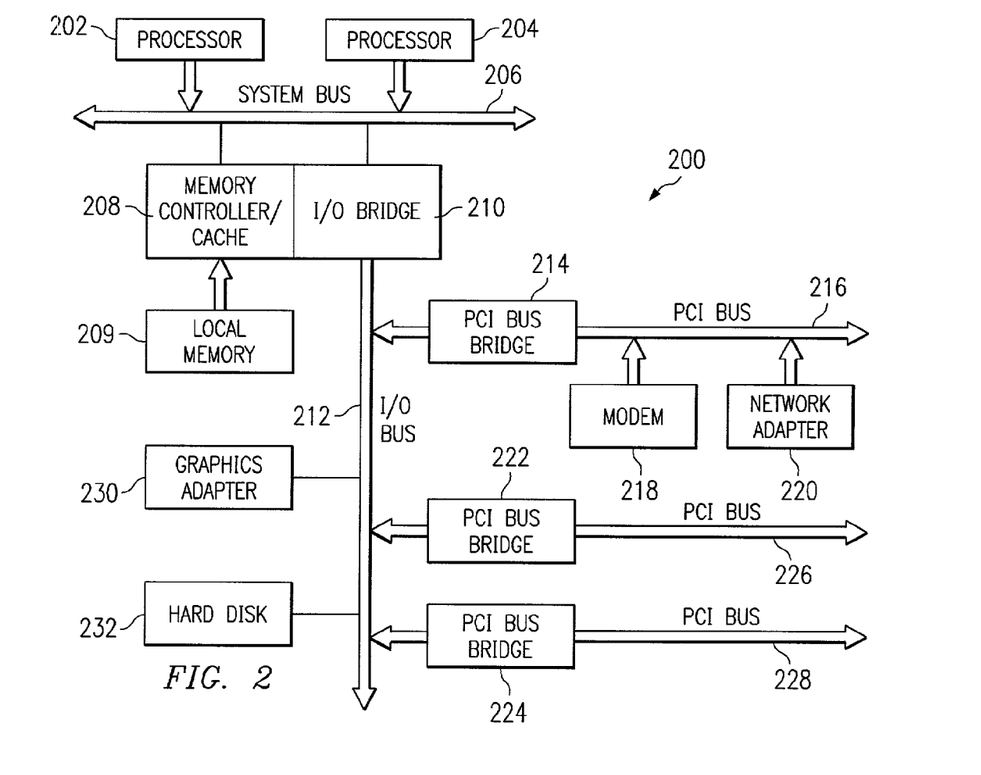
FIG. 2 is an exemplary block diagram of a server apparatus according to the present invention.

Referring to FIG. 2, a block diagram of a data processing system that may be implemented as a server, such as server 104 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to clients 108–112 in FIG. 1 may be provided through modem 218 and network adapter 220 connected to PCI local bus 216 through add-in boards.

Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM e-Server pSeries system, a product of International Business Machines Corporation in Armonk, N.Y., running the Advanced Interactive Executive (AIX) operating system or LINUX operating system.

Figure 3:
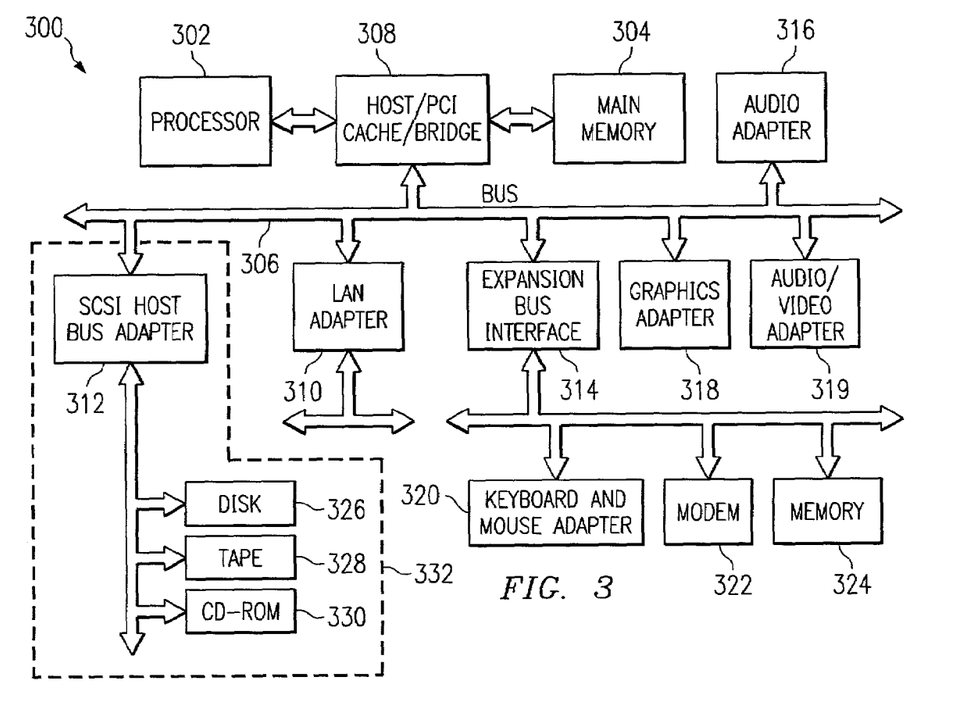
FIG. 3 is an exemplary block diagram of a client apparatus according to the present invention.

With reference now to FIG. 3, a block diagram illustrating a data processing system is depicted in which the present invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. Small computer system interface (SCSI) host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows 2000, which is available from Microsoft Corporation. An object oriented programming system such as Java may run in conjunction with the operating system and provide calls to the operating system from Java programs or applications executing on data processing system 300. "Java" is a trademark of Sun Microsystems, Inc. Instructions for the operating system, the object-oriented operating system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash ROM (or equivalent nonvolatile memory) or optical disk drives and the like, may be used in addition to or in place of the hardware depicted in FIG. 3. Also, the processes of the present invention may be applied to a multiprocessor data processing system.

As another example, data processing system 300 may be a stand-alone system configured to be bootable without relying on some type of network communication interface, whether or not data processing system 300 comprises some type of network communication interface. As a further example, data processing system 300 may be a personal digital assistant (PDA) device, which is configured with ROM and/or flash ROM in order to provide nonvolatile memory for storing operating system files and/or user-generated data.

The depicted example in FIG. 3 and above-described examples are not meant to imply architectural limitations. For example, data processing system 300 also may be a notebook computer or hand held computer in addition to taking the form of a PDA. Data processing system 300 also may be a kiosk or a Web appliance.

Figure 4:
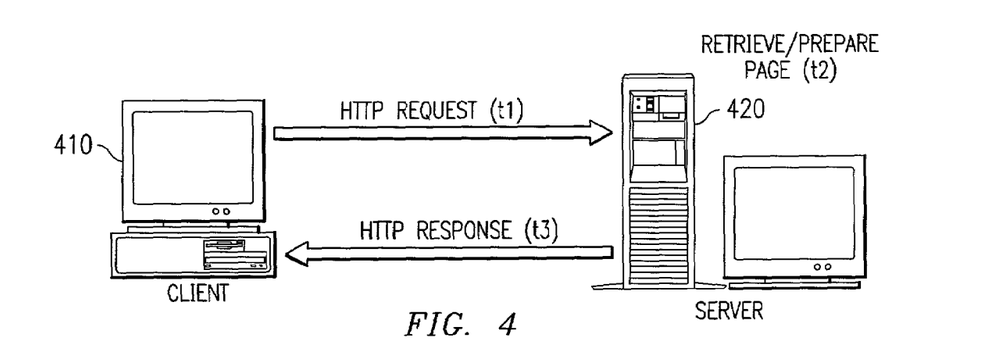
FIG. 4 is an exemplary diagram illustrating the time elements involved in a conventional request for content from a server.

FIG. 4 is an exemplary diagram illustrating the time elements involved in a conventional request for content from a server. The depicted example is of an HTTP based distributed data processing system in which a client device 410 requests HTML web pages over HTTP from server 420. The sending of the HTTP request requires a first time, t1, for the transmission to be completed. The server 420 then requires a second time, t2, to retrieve and prepare the content, e.g. a web page, for download to the client device 410. A third time, t3, is required for the actual transmission of the content to the client device 410.

Typically, t1 is negligible when the network is performing as expected since an HTTP content request is typically a small burst of data. The time t2 is negligible when the server is simply retrieving data from disk storage since disk seek and read times are significantly smaller than network transfer times. The time t3 is usually the vast majority of the user's waiting time since transferring content over the network is bound to the slowest upload/download rate between the client and the server.

With current progress bars used by web browsers and the like, only the time t3 is represented. In other words, the progress bars in known web browsers base their representations of the progress of a content request only on the size of the content being downloaded and the approximate rate of download. In most cases, this is a satisfactory estimation of the progress of the content request.

However, there are many cases where t2 is much larger than t1+t3 and many cases where t2 is approximately the same as t3. That is, there are many cases in which the retrieval and preparation time for the requested content is a large factor in the overall waiting time of the user. In other words, t1 is still negligible when the network is performing as expected, t2 is non-negligible when the server must perform intense calculations or spawn additional processes in preparing the content for download, and t3 is no longer the vast majority of the user's waiting time although the transfer of content over the network is still bound to the slowest upload/download rate between the client and the server.

The present invention provides an improved graphical representation of the progress of a content request which takes into account t2. This improved graphical representation may provide indications of total progress based on all of t1, t2 and t3 or only t2 and t3. In this way, the user is provided with a more accurate representation of the progress of his/her content request since the representation includes the retrieval/preparation time as well as the transfer time over the network.

Figure 5:
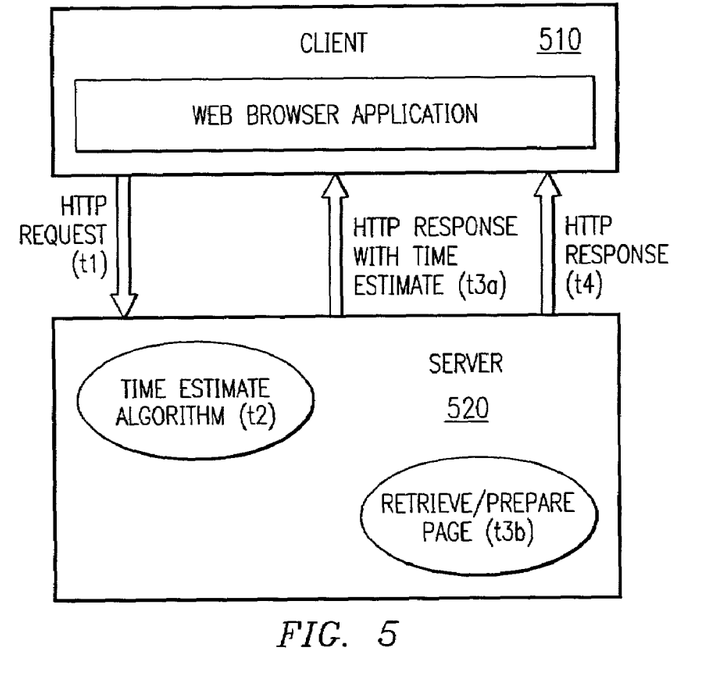
FIG. 5 is an exemplary diagram illustrating the time elements involved in a request for content in accordance with the present invention.

FIG. 5 is an exemplary diagram illustrating the time elements involved in a request for content in accordance with the present invention. As shown in FIG. 5, the present invention involves a content request, e.g., a HTTP request, being sent from a client device 510 using a web browser 515, to a server 520 in a manner generally known in the art. The transmission of this HTTP request from the client device 510 to the server 520 requires a first time, t1.

Upon receiving the HTTP request, the server 520 initiates a time estimation algorithm that may estimate one or more of the retrieval/preparation time, the transmission time, a total time for completion of the HTTP request, etc. The time required to prepare this time estimate is t2. The time estimate, t2, is then transmitted to the client device 510. The amount of time required to transmit the time estimate to the client device 510 is t3a.

After determining an estimate of the completion time, or approximately at the same time as determining the estimate of the completion time, the server 520 performs the functions of retrieving/preparing the requested content, e.g. the requested web page. The time to retrieve/prepare the requested content is referred to as time t3. Once the requested content is retrieved/prepared, the content is transmitted to the client device 510 which takes a time t4 to complete.

In the present invention, the time t1 remains negligible when the network is performing as expected due to the very small burst of data required to transmit the HTTP request. The time t2 is negligible in that the algorithm performs its functions, in a preferred embodiment, by performing a very quick table lookup to identify an estimated retrieval/preparation time for the requested content.

The time t3a is also negligible when the network is performing as expected since this again, is a very small burst of data consisting of little more than one or a few numbers identifying completion times. The time t3b is non-negligible when the server must perform intense calculations or spawn additional processes in preparing the requested content for transmission to the client device 510. The time t4 is non-negligible when the requested content consists of any significant amount of data since transferring content over the network is bound to the client device's download rate.

As touched on above, the generation of the time estimate may take on many different forms. For example, if information is known about the internal processes used by the server 520 to retrieve/prepare the requested content, an estimate may be generated based on how long it will take these processes to retrieve/prepare the requested content. For example, if it is known that program A must be run to generate the requested content and that program A typically takes three seconds to run, then an accurate time estimate for the retrieval/preparation of the requested content will be around three seconds.

In another example, if it is known that a particular program that is run to prepare the requested content comprises X lines of code and the processor in the server 520 is capable of running Y lines of code per millisecond, then an accurate estimate of the time required to retrieve/prepare the requested content would be X/Y milliseconds.

Still further, the current workload on the server that is the source of the requested information and the available bandwith may be used as parameters used to generate the estimates of time of completion either alone or in addition to other parameters. Other approaches based on knowledge of the processes used to retrieve/prepare the requested content and information about the capabilities of the server system may be used without departing from the spirit and scope of the present invention.

Such detailed information about the processes employed by the server and the capabilities of the server may not always be available. In a preferred embodiment of the present invention, the time estimation is based on a table lookup of previous content requests that have been completed. The table lookup involves taking the parameters included in the received content request and performing a lookup in the table based on these parameters to thereby identify a previously completed request that best matches the parameters of the current content request.

The previously completed request entry in the lookup table includes the request, any parameters attached to the request, and the system load at the time the request was handled. In addition, associated with this previously completed request entry is a time record indicating one or more of how long it took to retrieve/prepare the requested content and how long it took to complete the request. This time record is then used to generate an estimate for the current content request.

In generating an estimate for the current content request, the retrieved time record and current conditions, e.g., system load, are used to estimate a time for completion of the retrieval and/or preparation of the requested content. For example, the time indicated in the time record may be adjusted based on a difference between the current system load and the system load identified in the previously completed request entry in the lookup table. In a preferred embodiment, a percentage difference is used to adjust the time indicated in the time record such that, for example, if the current system load is 78% of the system load indicated in the previously completed request entry, then the time required to retrieve/prepare the requested content may be closer to 78% of the time indicated in the time record associated with the previously completed request entry in the lookup table. Of course, the system load level may be determined based on processor utilization. However, the system load may also be determined based on the performance of any other device in the computing system besides the processor. Other ways in which to adjust the time estimation based on current system conditions may be used without departing from the spirit and scope of the present invention.

It is feasible that there may be many records in the lookup table that are close or exact matches for the currently handled content request. In such a case, an average of the retrieved time records may be used as the initial estimate for the time to complete the retrieval/preparation of the requested content. In addition, the time estimation algorithm may keep track of the minimum, average, and maximum times retrieved during the table lookup and provide this information to the client device for use in generating the graphical representation of the progress of the content request, as described in greater detail hereafter.

Moreover, the table lookup may include looking at the most recent similar requests, as opposed to all of the previous similar requests, to estimate whether the current request will be closer to the minimum, average or maximum times of completion. That is, the server processing conditions will more likely be similar to the most recent similar requests and thus, these requests will be a better estimate of the probable time of completion. In addition, estimated peak times of server usage may be correlated to the information obtained from the table lookup to obtain a better estimate as to whether the current request's time of completion will fall closer to the minimum, average or maximum time of completion.

In addition to the above, when the content request is received by the time estimation algorithm, after the table lookup is performed, the time estimation algorithm stores a new entry in the table for the current content request. This new entry includes the request, any parameters attached to the request, and the system load conditions. When the content requested by the content request is transmitted to the client device 510, the time estimation algorithm records the actual elapsed time necessary to complete the retrieval and/or preparation of the content and associates this elapsed time with the new table entry for this content request. In this way, the lookup table is dynamically updated with each content request being processed and the system becomes more knowledgeable over time.

With this dynamically updated lookup table, the size of the lookup table may become too large if left unchecked. To handle this potential problem, a server administrator or automated process may be used to clear the table similar to the way such a process might clear a web browser's cached memory. A user configurable parameter may be set to identify the number of entries to retain and removing some least important entries, such as the oldest entries, once the user defined limit is reached. Another solution is that the system may have a user configurable parameter for the maximum time required to process the table, and once this limit is reached, some least important entries are removed.

In a preferred embodiment, the lookup table may be archived occasionally to prune out duplicate entries and perform minimum/maximum/average wait time calculations offline. In this embodiment, two tables are stored: 1) a complete table with one entry per client request, and 2) a smaller table with one entry per unique type of client request which contains the minimum, maximum, average, etc., statistics for this type of request. Each time a client request is made, the time estimation algorithm writes to table 1, and reads from table 2 (which should be smaller than table 1), and the archiving utility automatically runs as often as necessary to keep the data as accurate as desired. Note that the above propositions may in fact be used in combination to provide the best solutions.

After generating the time estimate for the current content request, the time estimate is sent to the client device for use in generating a graphical representation of the progress of the handling of the content request. In one embodiment, the time estimate is used in conjunction with a second time estimate that is based on the size of the content and the download rate of the client device's connection to the network. The combination of the two time estimates constitutes an estimate of the amount of time for completion of the content request. The combination of these time estimates is then used to generate a graphical representation of the progress of the current content request handling.

The graphical representation can take any form that may be informative to the user of the client device 510. In a preferred embodiment, the graphical representation takes the form of a progress bar that may be accompanied by explanatory text. The progress bar is filled, or emptied, as progress is made in handling the content request. For example, when the first time estimate is received from the server, and the total time estimate for handling the content request is calculated, the graphical representation is displayed on a display associated with the client device 510. An internal clock in the client device 510 is then used to count down the time elapsing while the client device 510 waits for transmission of the requested content to begin. The time remaining for completion of the content request may be displayed based on the total time estimate calculated and the counting down using the client device system clock.

A textual message indicating the current operations being performed, such as "preparing requested content" or "downloading content", may be displayed along with the progress bar to inform the user of the current operations being performed. This textual message may change, for example from "preparing requested content" to "downloading content," when the first data packet containing the requested content is received by the client device 510. When the first data packet containing the requested content is received, the count down of the remaining time required is changed from being based on the system clock, to being based on the size of the data to be downloaded and the download rate. In this way, a more accurate depiction of the current status of the handling of a content request may be provided to the user of the client device.

In addition, the time estimate received from the server may further include indications of the minimum, average and maximum time estimates for retrieval/preparation of the requested content. These values may be used along with the second time estimate to generate minimum, average, and maximum total time estimates which are then depicted in the graphical representation. In this way, the user of the client device 510 is informed of the shortest, average and longest waiting times one might realistically expect.

Further, the graphical representation of the time estimates, e.g., the progress bar, may use different coloring, patterns, symbols, or the like, to designate the different time estimates associated with retrieving/preparing the requested content and transmission of the requested content. In this way, the user is informed of how much time it will take to prepare the content and how much time it will take to download the content. Other methods of denoting these two different time estimates may be used without departing from the spirit and scope of the present invention.

Figure 6:
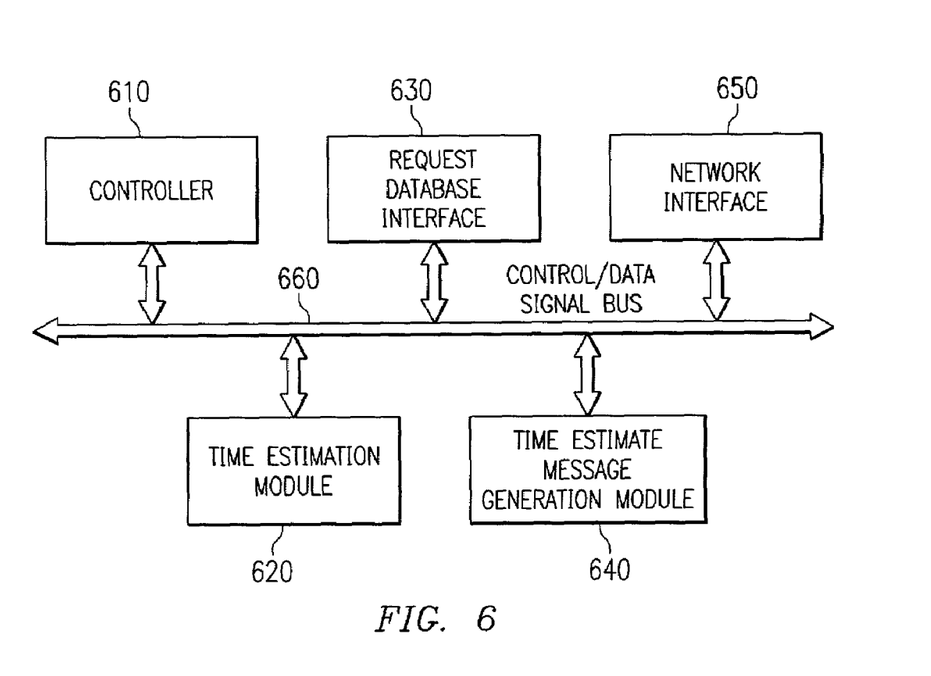
FIG. 6 is an exemplary block diagram illustrating the primary operational components of a time estimation apparatus in accordance with the present invention.

FIG. 6 is an exemplary block diagram illustrating the primary operational components of a time estimation apparatus in accordance with the present invention. The elements shown in FIG. 6 may be implemented as software, hardware, or any combination of software and hardware. In a preferred embodiment, the elements shown in FIG. 6 are implemented as software instructions executed by one or more hardware elements of a server apparatus.

As shown in FIG. 6, the time estimation apparatus includes a controller 610, a time estimation module 620, a request database interface 630, a time estimate message generation module 640, and a network interface 650. The elements 610–650 are coupled to one another via the control/data signal bus 660. Although a bus architecture is shown in FIG. 6, the present invention is not limited to such and any architecture that facilitates the communication of control/data signals between the elements 610–650 may be used without departing from the spirit and scope of the present invention.

The controller 610 is used to control the overall operation of the time estimation apparatus and orchestrates the operation of the other elements 620–650. The time estimation module 620 performs the functions previously described, involving the lookup in the previously completed requests table, the modification of the time estimate based on current system load and conditions, the recording of the current content request in the previously completed requests table, and the like. The time estimation module 620 obtains access to the previously completed requests table via the request database interface 630.

The time estimate message generation module 640 generates a time estimate message based on information transmitted to it by the time estimation module 620. This information may include, for example, a time estimate for completion of the retrieval/preparation of the request content. In addition, this information may include a minimum, average, and maximum time estimate for completion of the retrieval/preparation of the requested content. The time estimate message generation module 640 generates the time estimate message and then transmits it to the client device via the network interface 650.

Figure 7:
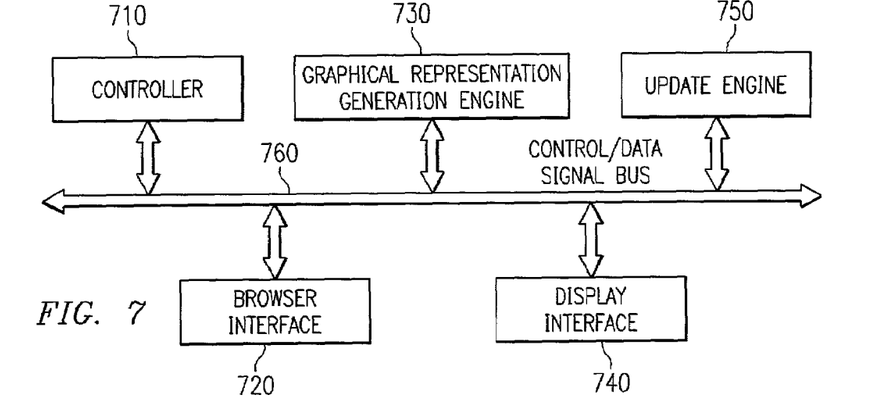
FIG. 7 is an exemplary block diagram illustrating a progress graphical representation generation device according to the present invention.

FIG. 7 is an exemplary block diagram illustrating a progress graphical representation generation device according to the present invention. The elements shown in FIG. 7 may be implemented as software, hardware, or any combination of software and hardware. In a preferred embodiment, the elements shown in FIG. 7 are implemented as software instructions executed by one or more hardware elements of a server apparatus.

As software instructions implemented by one or more hardware elements, there are many ways in which the progress graphical representation generation device may be implemented in a client system. For example, in one embodiment, the progress graphical representation device may be implemented as a separate application from the browser application that is run as a background application. In another embodiment, the present invention may be implemented as part of the browser application or as a plugin application to the web browser application. As part of the browser or as a plugin, the present invention may generate the graphical representation as part of the browser application, as a separate web page, or the like. Many possibilities exist which are not explicitly described here but are intended to be within the spirit and scope of the present invention as is readily apparent to those of ordinary skill in the art.

As shown in FIG. 7, the progress graphical representation generation device includes a controller 710, a browser interface 720, a graphical representation generation engine 730, a display interface 740, and an update engine 750. The elements 710–750 are coupled to one another via the control/data signal bus 760. Although a bus architecture is shown, the present invention is not limited to such and any architecture that facilitates the communication of control/data signals between the elements 710–750 may be used without departing from the spirit and scope of the present invention.

The controller 710 controls the overall operation of the progress graphical representation generation device and orchestrates the operation of the other elements 720–750. The browser interface 720 provides a mechanism through which time estimation information and indications of when content data is received may be obtained. The graphical representation generation engine 730 performs the functions of the present invention with regard to generating a graphical representation of the time estimates provided by the server and/or web browser with regard to completion of the current content request. The display interface 740 provides a mechanism through which the graphical representation of the time estimate may be output to a display associated with the client device. The update engine 750 continuously updates the graphical representation being output to the display based on one or more of the system clock and calculations regarding the download rate and the amount of data left to be downloaded.

Figure 8:
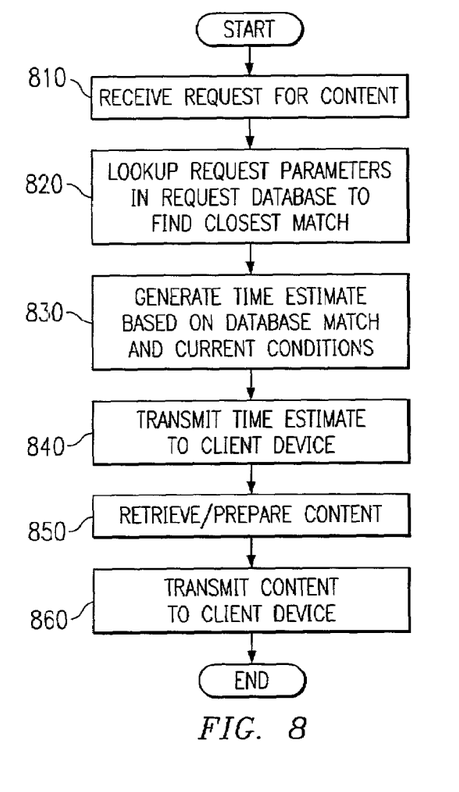
FIG. 8 is a flowchart outlining an exemplary operation of the time estimation apparatus according to the present invention.

FIG. 8 is a flowchart outlining an exemplary operation of the time estimation apparatus according to the present invention. As shown in FIG. 8, the operation starts with receipt of a content request from a client device (step 810). A lookup of the request parameters in the previously completed request table of the request database is made to find one or more closest matches to the current parameters (step 820). A time estimate is then generated based on the matches identified and the current system load and conditions (step 830). The time estimate is then transmitted to the client device (step 840).

Thereafter, or at substantially the same time as steps 820–840, the requested content is retrieved and/or prepared (step 850). The content is then transmitted to the client device (step 860) and the operation ends. It should be noted that the steps 820–840, and step 850 may execute in parallel. The retrieval/preparation of the content is not dependent on the time estimation steps. Steps 820–840, rather, are auxiliary to the preparation of the data.

Figure 9:
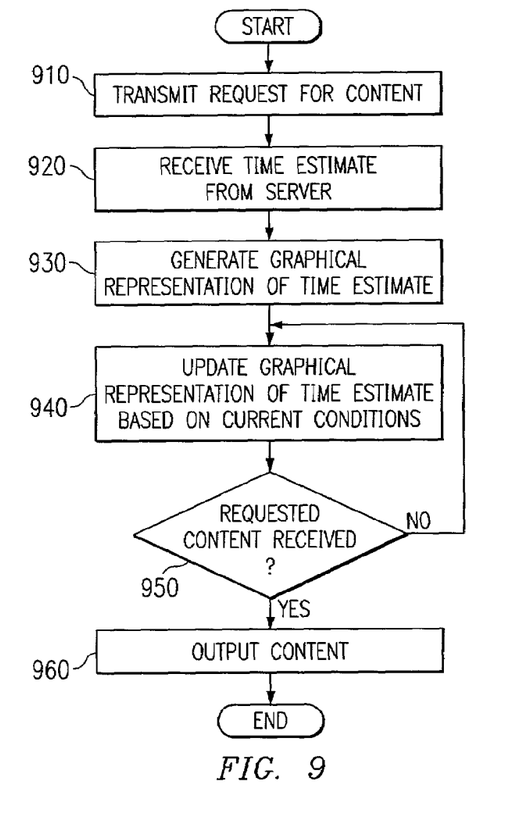
FIG. 9 is a flowchart outlining an exemplary operation of a client component for outputting a graphical representation of a time estimate in accordance with the present invention.

FIG. 9 is a flowchart outlining an exemplary operation of a client component for outputting a graphical representation of a time estimate in accordance with the present invention. As shown in FIG. 9, the operation starts with the transmission of a content request to a server (step 910). A time estimate is received from the server (step 920) and a graphical representation of the time estimate is generated and output to the client device display (step 930). The graphical representation is then updated based on current conditions, e.g. based on the system clock or the download rate and the amount of data to be downloaded (step 940).

A determination is then made as to whether the content is received (step 950). If not, the operation returns to step 940 and updating of the graphical representation continues. If the content has been received, the operation outputs the content (step 960) and the operation ends.

Figure 10:
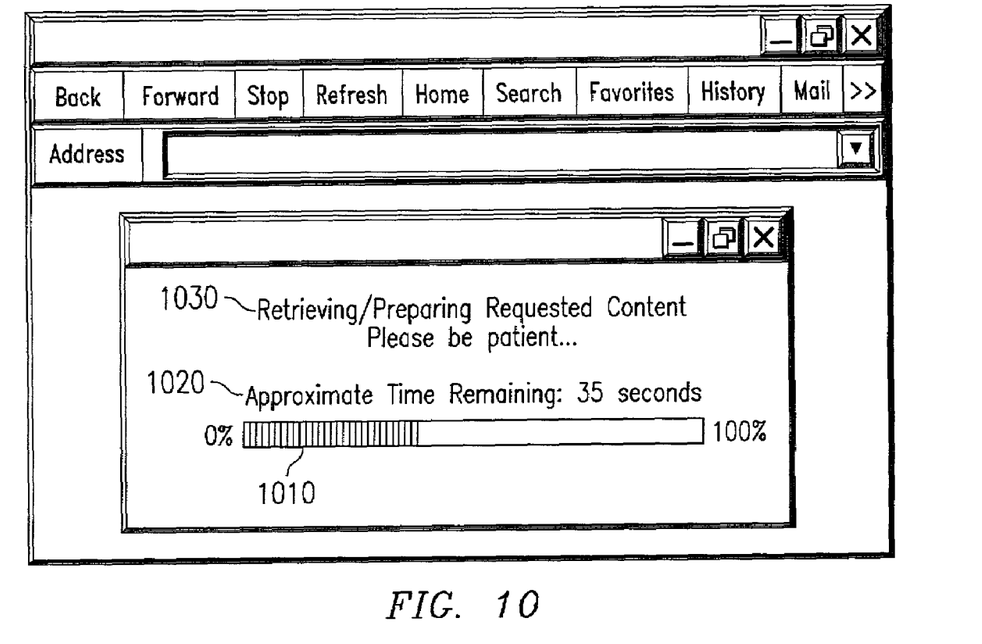
FIG. 10 is an exemplary diagram of a graphical representation of a time estimate when the requested content is being prepared by the server.

FIG. 10 is an exemplary diagram of a graphical representation of a time estimate when the requested content is being prepared by the server. As shown in FIG. 10, the graphical representation includes a progress bar 1010, a textual message identifying the approximate amount of time remaining for completion of the content request 1020, and a textual message identifying the current operations being performed (step 1030. In the particular example shown, the textual message 1020 indicates that there is approximately 35 more seconds required for completion of the content request. This 35 seconds is a combination of the remaining time for retrieval/preparation of the content and the estimated amount of time for transmission of the content from the server to the client device.

Moreover, the current operation being performed is the retrieval/preparation of the requested content as stated by textual message 1030. This textual message 1040 will be modified once transmission of the requested content commences, as shown in the following figure.

Figure 11:
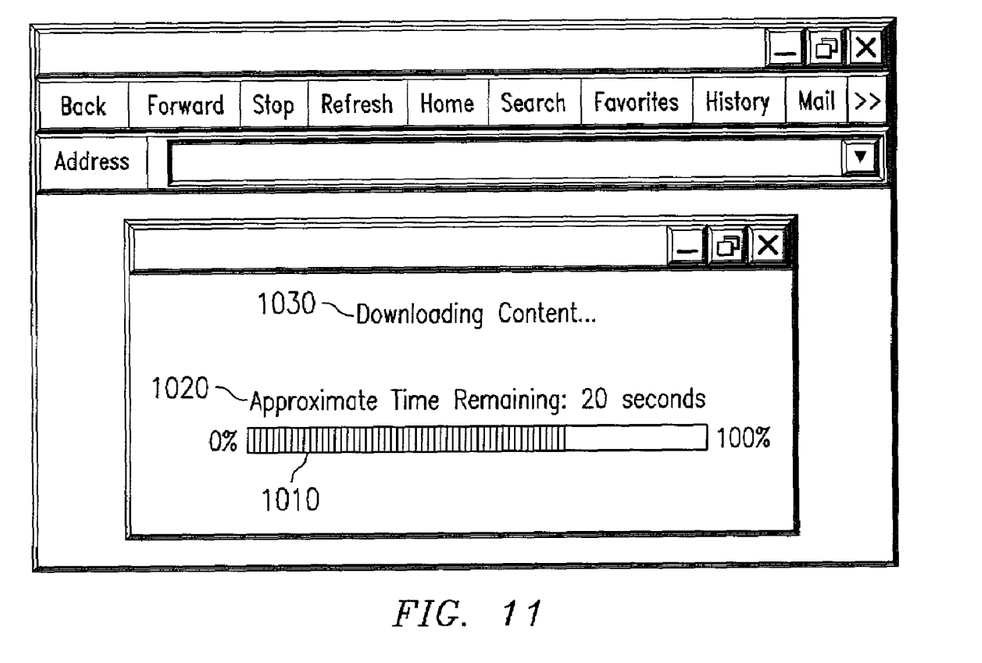
FIG. 11 is an exemplary diagram of a graphical representation of a time estimate when the requested content has been prepared and is currently being downloaded to the client device.

FIG. 11 is an exemplary diagram of a graphical representation of a time estimate when the requested content has been prepared and is currently being downloaded to the client device. As shown in FIG. 11, the progress bar 1010 has changed to reflect the progress of handling the content request. In addition, the approximate time textual message 1020 has changed to 20 seconds. The 20 seconds time estimate is based on the current download rate and the amount of data left to be downloaded. The operation textual message 1030 is now changed to "downloading content" since the requested content is starting to be received by the client device. Of course, many modifications to the apparatus and method of generating a graphical representation of the progress of handling a content request may be made without departing from the spirit and scope of the present invention.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMS, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method of generating an estimate of an amount of time required to complete a content request for content to be transmitted over a network, comprising:

receiving a first estimate of an amount of time to retrieve or prepare requested content in a content source device;

generating a second estimate of an amount of time to receive the requested content over a communication link from the content source device;

generating a third estimate of a total amount of time to complete the content request based on the first and second time estimates;

generating a graphical representation of the third estimate; and outputting the graphical representation on a display device.

2. The method of claim 1, wherein the first estimate is generated using a table lookup of previously handled content requests.

3. The method of claim 2, wherein the table lookup includes finding one or more entries in a table that have parameters similar to parameters included in the content request.

4. The method of claim 3, wherein the table is dynamically updated with each content request by storing a new entry in the table for each content request, and wherein the new entry includes the content request, any parameters attached to the content request, load conditions, and actual elapsed time necessary to retrieve or prepare the requested content.

5. The method of claim 1, wherein the first estimate is generated based on information identifying the processes used to retrieve or prepare the requested content.

6. The method of claim 5, wherein the information includes at least one of an identifier of a program to be used to retrieve or prepare the requested content, a typical execution time forte program, a number of lines of code in the program, and a number of lines of code per second handled by a processor of the content source device.

7. The method of claim 1, wherein the second estimate is generated based on an amount of content to be transmitted and a transmission rate.

8. The method of claim 1, wherein the graphical representation includes associated text, and wherein the associated text is changed from a first text to a second text when the requested content begins to be received from the content source device.

9. The method of claim 1, further comprising:
updating the graphical representation based on the occurrence of en event.

10. The method of claim 9, wherein the event is an increment of a predetermined amount of time of a system clock.

11. The method of claim 9, wherein the event is receipt of a portion of the requested content.

12. The method of claim 1, wherein the graphical representation represents the third estimate as a combination of the first estimate and the second estimate, wherein a representation of the first estimate in the graphical representation is different from a representation of the second estimate in the graphical representation.

13. The method of claim 12, wherein the first estimate is represented in a different color than the second estimate.

14. The method of claim 1, wherein the graphical representation is a progress bar.

15. The method of claim 1, wherein the method is implemented by a web browser application on a computing device.

16. The method of claim 1, wherein the method is implemented by a plugin application to a web browser application on a computing device.

17. A computer program product for generating an estimate of an amount of time required to complete a content request for content to be transmitted over a network, comprising:
first instruction for receiving a first estimate of an amount of time to retrieve or prepare requested content in a content source device, wherein the first estimate includes a minimum, maximum, and average amount of time to retrieve or prepare the requested content;
second instructions for generating a second estimate of an amount of time to receive the requested content over a communication link from the content source device;
third instructions for generating a third estimate of a total amount of time to complete the content request based on the first and second time estimates, wherein the third estimate includes a minimum, maximum, and average total amount of time to complete the content request
fourth instructions for generating a graphical representation of the third estimate, wherein the graphical representation includes an indicator for each of the minimum, maximum, and average total amount of time to complete the content request; and
fifth instructions for outputting the graphical representation on a display device.

18. The computer program product of claim 17, wherein the second instructions for generating the second estimate includes instructions for generating the second estimate based on an amount of content to be transmitted and a transmission rate.

19. The computer program product of claim 17, wherein the graphical representation includes associated text, and wherein the associated text is changed from a first text to a second text when the requested content begins to be received from the content source device.

20. The computer program product of claim 17, further comprising:
sixth instructions for updating the graphical representation based on the occurrence of an event.

21. The computer program product of claim 20, wherein the event is an increment of a predetermined amount of time of a system clock.

22. The computer program product of claim 20, wherein the event is receipt of a portion of the requested content.

23. The computer program product of claim 17, wherein the graphical representation represents the third estimate as a combination of the first estimate and the second estimate, wherein a representation of the first estimate in the graphical representation is different from a representation of the second estimate in the graphical representation.

24. The computer program product of claim 23, wherein the first estimate is represented in a different color than the second estimate.

25. The computer program product of claim 17, wherein the graphical representation is a progress bar.

26. The computer program product of claim 17, wherein the first estimate is generated using a table lookup of previously handled content requests.

27. The computer program product of claim 26, wherein the table lookup includes a first and second table, and wherein the first table includes one new entry for each content request, and wherein the second table includes one new entry for each unique content request that contains minimum, maximum, and average time calculations for each unique content request.

28. An apparatus for generating an estimate of an amount of time required to complete a content request for content to be transmitted over a network comprising:
means for receiving a first estimate of an amount of time to retrieve or prepare requested content in a content source device, wherein the first estimate includes a minimum, maximum, and average amount of time to retrieve or prepare the requested content;
means for generating a second estimate of an amount of time to receive the requested content over a communication link from the content source device;
means for generating a third estimate of a total amount of time to complete the content request based on the first and second time estimates, wherein the third estimate includes a minimum, maximum, and average total amount of time to complete the content request;
means for generating a graphical representation of the third estimate, wherein the graphical representation includes an indicator for each of the minimum, maximum, and average total amount of time to complete the content request; and
means for outputting the graphical representation on a display device.

* * * * *